United States Patent
Karale et al.

(10) Patent No.: US 10,047,268 B2
(45) Date of Patent: *Aug. 14, 2018

(54) SELF-TRIGGERING LOST CIRCULATION CONTROL IN CARBONATE FORMATION

(71) Applicant: Halliburton Energy Services, Inc., Houston, TX (US)

(72) Inventors: Chaitanya Mallikarjun Karale, Pune (IN); Sharath Savari, Kingwood, TX (US); Vijaya Kumar Patnana, Visakhapatnam (IN); Prajakta R Patil, Pune (IN)

( * ) Notice: Subject to any disclaimer, the term of this patent is extended or adjusted under 35 U.S.C. 154(b) by 1067 days.

This patent is subject to a terminal disclaimer.

(21) Appl. No.: 13/903,108

(22) Filed: May 28, 2013

(65) Prior Publication Data

US 2014/0353042 A1    Dec. 4, 2014

(51) Int. Cl.
| | |
|---|---|
| *E21B 47/00* | (2012.01) |
| *C09K 8/04* | (2006.01) |
| *C09K 8/12* | (2006.01) |
| *C09K 8/24* | (2006.01) |
| *C09K 8/512* | (2006.01) |
| *C09K 8/72* | (2006.01) |

(52) U.S. Cl.
CPC .................. *C09K 8/04* (2013.01); *C09K 8/12* (2013.01); *C09K 8/24* (2013.01); *C09K 8/512* (2013.01); *C09K 8/725* (2013.01); *C09K 2208/26* (2013.01)

(58) Field of Classification Search
CPC ........................................................ C09K 8/04
See application file for complete search history.

(56) References Cited

U.S. PATENT DOCUMENTS

| | | | | |
|---|---|---|---|---|
| 6,225,261 B1 * | 5/2001 | Brezinski | ............... | C09K 8/528 166/311 |
| 7,220,707 B2 * | 5/2007 | Massam | ............. | C04B 20/1022 507/140 |
| 7,566,686 B2 * | 7/2009 | Kippie | ..................... | C09K 8/12 507/110 |
| 2009/0023613 A1 * | 1/2009 | Li | ......................... | C09K 8/528 507/211 |
| 2012/0234543 A1 * | 9/2012 | Pauls | ....................... | C09K 8/76 166/300 |
| 2014/0116707 A1 * | 5/2014 | Sarda | ...................... | C09K 8/74 166/307 |

FOREIGN PATENT DOCUMENTS

EP          0278540      *    8/1992   ............  E21B 43/26

OTHER PUBLICATIONS

R.R. Ratnakar, N. Kalia, and V. Balkitaiah, "Carbonate Matrix Acidizing with Gelled Acids: An Experiment-Based Modeling Study," Society of Petroleum Engineers (SPE) International Production and Operations Conference and Exhibition held in Doha Qatar, May 14-16, 2012, SPE 154936, pp. 1-16.

* cited by examiner

*Primary Examiner* — Angela M DiTrani
*Assistant Examiner* — Avi T Skaist
(74) *Attorney, Agent, or Firm* — Tenley Krueger; Baker Botts L.L.P.

(57) ABSTRACT

A self-triggering, in-situ crosslinking fluid system is provided for controlling lost circulation for drilling in a carbonate formation. Methods of drilling a well include the steps of: (A) forming a drilling fluid comprising an aqueous phase, wherein the aqueous phase comprises: (i) water; (ii) acid, wherein the acid is at least sufficiently strong and in at least a sufficient concentration such that the aqueous phase has an initial pH of less than about 2; (iii) a viscosity-increasing agent; and (iv) a crosslinker, wherein the crosslinker is selected or controlled to crosslink the viscosity-increasing agent at a pH range anywhere in a range of about 1.5 to about 6.5 and that is at least higher than the initial pH of the aqueous phase; and (B) drilling with the drilling fluid to form a wellbore penetrating a subterranean formation.

18 Claims, No Drawings

SELF-TRIGGERING LOST CIRCULATION CONTROL IN CARBONATE FORMATION

CROSS-REFERENCE TO RELATED APPLICATIONS

Not applicable.

TECHNICAL FIELD

The inventions are in the field of producing crude oil or natural gas from subterranean formations. In general, the inventions relate to methods of drilling a well. More specifically, the inventions generally relate to controlling lost circulation during drilling into a carbonate formation.

BACKGROUND

To produce oil or gas from a reservoir, a well is drilled into a subterranean formation, which may be the reservoir or adjacent to the reservoir. Typically, a wellbore of a well must be drilled hundreds or thousands of feet into the earth to reach a hydrocarbon-bearing formation.
Drilling The well is created by drilling a hole into the earth (or seabed) with a drilling rig that rotates a drill string with a drilling bit attached to the downward end. Usually the borehole is anywhere between about 5 inches (13 cm) to about 36 inches (91 cm) in diameter. As upper portions are cased or lined, progressively smaller drilling strings and bits must be used to pass through the uphole casings or liners, which steps the borehole down to progressively smaller diameters.

While drilling an oil or gas well, a drilling fluid is circulated downhole through a drillpipe to a drill bit at the downhole end, out through the drill bit into the wellbore, and then back uphole to the surface through the annular path between the tubular drillpipe and the borehole. The purpose of the drilling fluid is to lubricate the drill string, maintain hydrostatic pressure in the wellbore, and carry rock cuttings out from the wellbore.

The drilling fluid can be water-based or oil-based. Oil-based fluids tend to have better lubricating properties than water-based fluids, nevertheless, other factors can mitigate in favor of using a water-based drilling fluid.

Both the dissolved solids and the undissolved solids can be chosen to help increase the density of the drilling fluid. An example of an undissolved weighting agent is barite (barium sulfate). The density of a drilling mud can be much higher than that of typical seawater or even higher than high-density brines due to the presence of suspended solids. The weight of pure water is about 8.3 ppg (990 g/l), whereas mud weights can range from about 6 ppg (720 g/l) to about 22 ppg (2600 g/l).

In addition, the drilling fluid may be viscosified to help suspend and carry rock cuttings out from the wellbore. Rock cuttings can range in size from silt-sized particles to chunks measured in centimeters. Carrying capacity refers to the ability of a circulating drilling fluid to transport rock cuttings out of a wellbore. Other terms for carrying capacity include hole-cleaning capacity and cuttings lifting.
Cementing, Completion, and Production After a portion of the wellbore is drilled, sections of pipe, referred to as casing, which are slightly smaller in diameter than the borehole, are placed in at least the uppermost portions of the wellbore. The casing provides structural integrity to the newly drilled borehole.

Primary cementing is typically performed whereby a cement slurry is placed in the annulus and permitted to set into a hard mass as a sheath to thereby attach the string of pipe to the walls of the wellbore and seal the annulus. The main objectives of primary cementing operations include zonal isolation to prevent migration of fluids in the annulus, support for the casing or liner string, and protection of the casing string from corrosive formation fluids. Subsequent secondary cementing operations may also be performed. Secondary or remedial cementing operations are performed to repair primary-cementing problems or to treat conditions arising after the wellbore has been constructed.

Completion is the process of making a well ready for production or injection. This principally involves preparing a zone of the wellbore to the required specifications, running in the production tubing and associated downhole equipment, as well as perforating and stimulating as required.

Oil or gas in the subterranean formation may be produced by driving fluid into the well using, for example, a pressure gradient that exists between the formation and the wellbore, the force of gravity, displacement of the fluid using a pump or the force of another fluid injected into the well or an adjacent well. The production of fluid in the formation may be increased by various stimulation techniques, such as hydraulically fracturing the formation. That is, a viscous fracturing fluid may be pumped down the casing to the formation at a rate and a pressure sufficient to form fractures that extend into the formation, providing additional pathways through which the oil or gas can flow to the well.
Fluid Loss and Lost Circulation In general, fluid loss refers to the undesirable leakage of a fluid phase of any type of drilling or treatment fluid into the permeable matrix of a subterranean formation. Fluids used in drilling, completion, or servicing of a wellbore can be lost to a subterranean formation while circulating the fluids in the wellbore. In particular, the fluids may enter the subterranean formation via depleted zones, zones of relatively low pressure, lost circulation zones having naturally occurring fractures, weak zones having fracture gradients exceeded by the hydrostatic pressure of the drilling fluid, and so forth.

During drilling, lost circulation refers to the reduced or total absence of fluid flow up the annulus when fluid is pumped through the drill string. As used herein, this reduction of flow can generally be classified as seepage of less than about 10 bbl/hr (about 1.2 $m^3$/hr), partial lost returns but still some returns, and total lost returns where no fluid returns up the annulus.

In the case of total lost returns, the wellbore may not remain full of fluid even if the pumps are turned off. If the hole does not remain full of fluid, the vertical height of the fluid column is reduced and the pressure exerted on the open formations is reduced. This in turn can result in another zone flowing into the wellbore, while the loss zone is taking mud. It may even result in a catastrophic loss of well control. The loss of fluid to a formation costs the drilling fluid and slows the drilling rate.
Lost Circulation Control In cases of high fluid loss, lost circulation control involving various plugging materials such as walnut hulls, mica, and cellophane have been used to prevent or lessen the loss of fluids from wellbores. Such non-degradable materials are suitable for use in non-producing zones, however, in producing zones the disadvantages of such materials include the potential for damage to the subterranean formations as a result of the inability to remove the plugging materials.

Damage to Permeability

In well treatments using viscous fluids, the material for increasing the viscosity of the fluid can damage the permeability of the subterranean formation.

After application of a lost circulation fluid or treatment, it may be desirable to restore permeability of the producing zone. If the formation permeability of the desired producing zone is not restored, production levels from the formation can be significantly lower. Any material in the zone resulting from a lost circulation control treatment must be removed to restore the formation's permeability, preferably to at least its original level.

Carbonate Formations and Lost Circulation

Lost circulation has been and still one of the major drilling related issues causing non-productive time ("NPT") on a drilling rig. So far, particulate based and chemistry based lost circulation materials ("LCMs") have been reportedly used quite successfully for combating drilling fluid losses while drilling into formations such as sandstone or shale.

Drilling carbonate formations is altogether a different scenario, however. Carbonate formations may be naturally highly fractured, vugular, or fragile. Carbonate formations tend to have complex porosity and permeability variations with irregular fluid flow paths. It has been reported that carbonate formations tend to break, just when the bit hits the formation while drilling. Lost circulation, even complete loss of circulation, may be encountered when drilling into these types of carbonate formations. This problem can be a rate determining step for drilling operations in such formations.

Controlling lost circulations in vugular or heavily fractured carbonate formations with particulate lost circulation material ("LCM") has not found much success till date. Contemporary practices in an effort to manage lost circulations when drilling into such carbonate formations include the use of highly viscous fluids or gunks. Many a times, however, these contemporary solutions would not find success as anticipated. As a last resort, mud cap drilling methods can be used, in which a high-viscous, low-cost fluid is pumped down the annulus that is lost into the formation following by another fluid system is pumped through drill string helping to drill ahead. Overall, however, to successfully drill ahead in carbonate highly vugular or heavily fractured carbonate formations without much NPT, controlling lost circulation would be an important part of a drilling plan.

SUMMARY OF THE INVENTION

Self-triggering lost circulation control during drilling a carbonate formation is provided using an in-situ crosslinking drilling fluid system. The components of the system are selected such that the carbonate formation itself can act a trigger for crosslinking and gelation of the fluid, which can be used to reduce lost circulation due to natural vugs and fractures while drilling in carbonate formations.

According to the invention, methods of drilling a well are provided, the methods including the steps of: (A) forming a drilling fluid comprising an aqueous phase, wherein the aqueous phase comprises: (i) water; (ii) acid, wherein the acid is at least sufficiently strong and in at least a sufficient concentration such that the aqueous phase has an initial pH of less than about 2; (iii) a viscosity-increasing agent; and (iv) a crosslinker, wherein the crosslinker is selected or controlled to crosslink the viscosity-increasing agent at a pH range anywhere in a range of about 1.5 to about 6.5 and that is at least higher than the initial pH of the aqueous phase; and (B) drilling with the drilling fluid to form a wellbore penetrating a subterranean formation.

These and other aspects of the invention will be apparent to one skilled in the art upon reading the following detailed description. While the invention is susceptible to various modifications and alternative forms, specific embodiments thereof will be described in detail and shown by way of example. It should be understood, however, that it is not intended to limit the invention to the particular forms disclosed, but, on the contrary, the invention is to cover all modifications and alternatives falling within the scope of the invention as expressed in the appended claims.

DETAILED DESCRIPTION OF PRESENTLY PREFERRED EMBODIMENTS AND BEST MODE

Definitions and Usages
General Interpretation

The words or terms used herein have their plain, ordinary meaning in the field of this disclosure, except to the extent explicitly and clearly defined in this disclosure or unless the specific context otherwise requires a different meaning.

If there is any conflict in the usages of a word or term in this disclosure and one or more patent(s) or other documents that may be incorporated by reference, the definitions that are consistent with this specification should be adopted.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed.

The indefinite articles "a" or "an" mean one or more than one of the component, part, or step that the article introduces.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

Whenever a requirement is "anywhere" in a range, this means at least one point within the range, not necessary every point in the range.

It should be understood that algebraic variables and other scientific symbols used herein are selected arbitrarily or according to convention. Other algebraic variables can be used.

The control or controlling of a condition includes any one or more of maintaining, applying, or varying of the condition. For example, controlling the temperature of a substance can include heating, cooling, or thermally insulating the substance.

Oil and Gas Reservoirs

In the context of production from a well, "oil" and "gas" are understood to refer to crude oil and natural gas, respectively. Oil and gas are naturally occurring hydrocarbons in certain subterranean formations.

A "subterranean formation" is a body of rock that has sufficiently distinctive characteristics and is sufficiently continuous for geologists to describe, map, and name it.

A subterranean formation having a sufficient porosity and permeability to store and transmit fluids is sometimes referred to as a "reservoir."

A subterranean formation containing oil or gas may be located under land or under the seabed off shore. Oil and gas reservoirs are typically located in a range of a few hundred feet (shallow reservoirs) to a few tens of thousands of feet (ultra-deep reservoirs) below the surface of the land or seabed.

As used herein, a subterranean formation having greater than about 50% by weight of inorganic carbonate materials is referred to as a "carbonate formation." For example, limestone is essentially calcium carbonate. Dolomite is essentially a combination of calcium carbonate and magnesium carbonate, wherein at least 50% of the cations are magnesium.

Well Services

To produce oil or gas from a reservoir, a wellbore is drilled into a subterranean formation, which may be the reservoir or adjacent to the reservoir. Typically, a wellbore of a well must be drilled hundreds or thousands of feet into the earth to reach a hydrocarbon-bearing formation.

Generally, well services include a wide variety of operations that may be performed in oil, gas, geothermal, or water wells, such as drilling, cementing, completion, and intervention. Well services are designed to facilitate or enhance the production of desirable fluids such as oil or gas from or through a subterranean formation. A well service usually involves introducing a fluid into a well.

Drilling is the process of drilling the wellbore.

Cementing is an operation in which a string of pipe, such as casing or liner, is cemented in a wellbore. The cement stabilizes the pipe in the wellbore and prevents undesirable migration of fluids along the annulus between the wellbore and the outside of the casing or liner from one zone along the wellbore to the next.

Completion is the process of making a well ready for production or injection. This principally involves preparing a zone of the wellbore to the required specifications, running in the production tubing and associated downhole equipment, as well as perforating and stimulating as required.

Drilling, completion, and other operations in a well can include various types of treatments that are commonly performed on a well or subterranean formation. For example, a treatment for lost circulation control can be used during drilling operations.

Well Terms

A "well" includes a wellhead and at least one wellbore from the wellhead penetrating the earth. The "wellhead" is the surface termination of a wellbore, which surface may be on land or on a seabed.

A "well site" is the geographical location of a wellhead of a well. It may include related facilities, such as a tank battery, separators, compressor stations, heating or other equipment, and fluid pits. If offshore, a well site can include a platform.

The "wellbore" refers to the drilled hole, including any cased or uncased portions of the well or any other tubulars in the well. The "borehole" usually refers to the inside wellbore wall, that is, the rock surface or wall that bounds the drilled hole. A wellbore can have portions that are vertical, horizontal, or anything in between, and it can have portions that are straight, curved, or branched. As used herein, "uphole," "downhole," and similar terms are relative to the direction of the wellhead, regardless of whether a wellbore portion is vertical or horizontal.

As used herein, introducing "into a well" means introducing at least into and through the wellhead. According to various techniques known in the art, tubulars, equipment, tools, or fluids can be directed from the wellhead into any desired portion of the wellbore.

As used herein, the word "tubular" means any kind of structural body in the general form of a tube. Examples of tubulars in oil wells include, but are not limited to, a drill pipe, a casing, a tubing string, a line pipe, and a transportation pipe. Tubulars can be of any suitable body material, but in the oilfield they are most commonly of steel.

As used herein, the term "annulus" means the space between two generally cylindrical objects, one inside the other. The objects can be concentric or eccentric. Without limitation, one of the objects can be a tubular and the other object can be an enclosed conduit. The enclosed conduit can be a wellbore or borehole or it can be another tubular. The following are some non-limiting examples illustrating some situations in which an annulus can exist. Referring to an oil, gas, or water well, in an open hole well, the space between the outside of a tubing string and the borehole of the wellbore is an annulus. In a cased hole, the space between the outside of the casing and the borehole is an annulus. In addition, in a cased hole there may be an annulus between the outside cylindrical portion of a tubular such as a production tubing string and the inside cylindrical portion of the casing. An annulus can be a space through which a fluid can flow or it can be filled with a material or object that blocks fluid flow, such as a packing element. Unless otherwise clear from the context, as used herein an "annulus" is a space through which a fluid can flow.

As used herein, a "fluid" broadly refers to any fluid adapted to be introduced into a well for any purpose. A fluid can be, for example, a drilling fluid, a setting composition, a treatment fluid, or a spacer fluid. If a fluid is to be used in a relatively small volume, for example less than about 200 barrels (about 8,400 US gallons or about 32 m$^3$), it is sometimes referred to as a wash, dump, slug, or pill.

As used herein, the word "treatment" refers to any treatment for changing a condition of a portion of a wellbore, or a subterranean formation adjacent a wellbore; however, the word "treatment" does not necessarily imply any particular treatment purpose. A treatment usually involves introducing a fluid for the treatment, in which case it may be referred to as a treatment fluid, into a well. As used herein, a "treatment fluid" is a fluid used in a treatment. The word "treatment" in the term "treatment fluid" does not necessarily imply any particular treatment or action by the fluid.

A lost circulation control fluid or pill is a fluid that is designed or used to provide some degree of lost circulation control. Especially through high viscosity, and optionally with solids bridging and possible cake buildup on the highly porous rock face, these pills oftentimes are able to substantially reduce high fluid losses into a formation.

In the context of a well or wellbore, a "portion" or "interval" refers to any downhole portion or interval of the length of a wellbore.

A "zone" refers to an interval of rock along a wellbore that is differentiated from uphole and downhole zones based on hydrocarbon content or other features, such as permeability, composition, perforations or other fluid communication with the wellbore, faults, or fractures. A zone of a wellbore that penetrates a hydrocarbon-bearing zone that is capable of producing hydrocarbon is referred to as a "production zone." A "treatment zone" refers to an interval of rock along a wellbore into which a fluid is directed to flow from the wellbore. As used herein, "into a treatment zone" means into and through the wellhead and, additionally, through the wellbore and into the treatment zone.

As used herein, a "downhole" fluid (or gel) is an in-situ fluid in a well, which may be the same as a fluid at the time it is introduced, or a fluid mixed with another fluid downhole, or a fluid in which chemical reactions are occurring or have occurred in-situ downhole.

The term "damage" as used herein regarding a formation refers to undesirable deposits in a subterranean formation that may reduce its permeability. Scale, skin, gel residue, and hydrates are contemplated by this term.

Generally, the greater the depth of the formation, the higher the static temperature and pressure of the formation. Initially, the static pressure equals the initial pressure in the formation before production. After production begins, the static pressure approaches the average reservoir pressure.

A "design" refers to the estimate or measure of one or more parameters planned or expected for a particular fluid or stage of a well service or treatment. For example, a fluid can be designed to have components that provide a minimum density or viscosity for at least a specified time under expected downhole conditions. A well service may include design parameters such as fluid volume to be pumped, required pumping time for a treatment, or the shear conditions of the pumping.

The term "design temperature" refers to an estimate or measurement of the actual temperature at the downhole environment during the time of a treatment. For example, the design temperature for a well treatment takes into account not only the bottom hole static temperature ("BHST"), but also the effect of the temperature of the fluid on the BHST during treatment. The design temperature for a fluid is sometimes referred to as the bottom hole circulation temperature ("BHCT"). Because fluids may be considerably cooler than BHST, the difference between the two temperatures can be quite large. Ultimately, if left undisturbed a subterranean formation will return to the BHST.

Two fluids are incompatible if undesirable physical or chemical interactions occur when the fluids are mixed. Incompatibility is characterized by undesirable changes in apparent viscosity and shear stresses. When apparent viscosity of the mixed fluids is greater than apparent viscosity of each individual fluid, they are said to be incompatible at the tested shear rate.

Drilling and Drilling Muds

A "bottom hole assembly" is the lower portion of a drill string, including at least a bit, stabilizers, a drill collar, jarring devices ("jars"), and at least one bottom hole tool selected from the group consisting of measurement while drilling ("MWD") tools and logging while drilling ("LWD") tools. For example, MWD tools include electromagnetic measurement while drilling ("EM/MWD") tools and seismic while drilling ("SWD") tools. The terms MWD and LWD are sometimes used interchangeably, but LWD is broadly directed to the process of obtaining information about the rock of the subterranean formation (porosity, resistivity, etc.), whereas MWD is broadly directed to the process or tools directed to obtaining information about the progress of the drilling operation (rate of penetration, weight on bit, wellbore trajectory for geo-steering, etc.).

Bottom hole tools typically have restricted fluid flow paths, which can be problematic for use of conventional cementing compositions or compositions having long fibers (greater than about 3 mm).

Drilling requires well control, which is maintaining pressure on open formations (that is, exposed to the wellbore) to prevent or direct the flow of formation fluids into the wellbore. This technology encompasses an estimation of formation fluid pressures, the strength of the subsurface formations, and the use of casing or mud density to offset those pressures in a predictable fashion. Well control also includes operational procedures to safely stop a well from flowing should an influx of formation fluid occur. To conduct well-control procedures, large valves are installed at the top of the well to enable closing the well if necessary.

Drilling fluid means the circulating fluid (mud) used in the rotary drilling of wells to clean and condition the hole and to counterbalance formation pressure. Drilling fluids, also known as drilling muds or simply "muds," are typically classified according to their base fluid, that is, the nature of the continuous phase.

Water-based drilling fluid or water-based mud ("WBM") means the continuous phase and suspending medium for solids is a water-miscible fluid, regardless of the presence of oil. For example, the water phase can be a brine. A brine-based drilling fluid is a water-based mud in which the aqueous component is brine. In some cases, oil may be emulsified in a water-based drilling mud.

Non-aqueous drilling fluid means the continuous phase and suspending medium for solids is a water-immiscible fluid, such as oleaginous materials (for example, mineral oil, enhanced mineral oil, paraffinic oil, C16 to C18 internal olefins, and C8 to C16 fatty acid/2-ethylhexyl esters). In some cases, a water phase is emulsified in the non-aqueous drilling fluid.

Oil-based ("OBM") means the continuous phase of the drilling fluid consists of diesel oil, mineral oil, or some other oil, but contains no synthetic material or enhanced mineral oil.

Synthetic-based drilling fluid or synthetic-based mud ("SBM") means the continuous phase of the drilling fluid is a synthetic material or a combination of synthetic materials. Synthetic material as applied to synthetic-based drilling fluid means material produced by the reaction of specific purified chemical feedstock, as opposed to the traditional base fluids such as diesel and mineral oil which are derived from crude oil solely through physical separation processes. Physical separation processes include fractionation and distillation or minor chemical reactions such as cracking and hydro processing. Internal olefins and vegetable esters are two examples of synthetic materials suitable for use by the oil and gas extraction industry in formulating drilling fluids. A synthetic-based drilling fluid may include a combination of synthetic materials.

Drill cuttings mean the particles generated by drilling into subsurface geologic formations and carried out from the wellbore with the drilling fluid. Examples of drill cuttings include small pieces of rock varying in size and texture from fine silt to gravel. Drill cuttings are generally generated from solids control equipment and settle out and accumulate in quiescent areas in the solids control equipment or other equipment processing drilling fluid as accumulated solids.

Substances, Polymers, and Derivatives

A substance can be a pure chemical or a mixture of two or more different chemicals.

As used herein, a "polymer" or "polymeric material" includes polymers, copolymers, terpolymers, etc. In addition, the term "copolymer" as used herein is not limited to the combination of polymers having two monomeric units, but includes any combination of monomeric units, for example, terpolymers, tetrapolymers, etc.

As used herein, "modified" or "derivative" means a chemical compound formed by a chemical process from a parent compound, wherein the chemical backbone skeleton of the parent compound is retained in the derivative. The chemical process preferably includes at most a few chemical reaction steps, and more preferably only one or two chemical reaction steps. As used herein, a "chemical reaction step" is a chemical reaction between two chemical reactant species to produce at least one chemically different species from the reactants (regardless of the number of transient chemical species that may be formed during the reaction). An example of a chemical step is a substitution reaction. Substitution on the reactive sites of a polymeric material may be partial or complete.

Phases, Physical States, and Materials

As used herein, "phase" is used to refer to a substance having a chemical composition and physical state that is distinguishable from an adjacent phase of a substance having a different chemical composition or a different physical state.

The word "material" is anything made of matter, constituted of one or more phases. Rock, water, air, metal, cement slurry, sand, and wood are all examples of materials. The word "material" can refer to a single phase of a substance on a bulk scale (larger than a particle) or a bulk scale of a mixture of phases, depending on the context.

As used herein, if not other otherwise specifically stated, the physical state or phase of a substance and other physical properties are determined at a temperature of 77° F. (25° C.) and a pressure of 1 atmosphere (Standard Laboratory Conditions) without applied shear.

Particles and Particulates

As used herein, a "particle" refers to a body having a finite mass and sufficient cohesion such that it can be considered as an entity but having relatively small dimensions. A particle can be of any size ranging from molecular scale to macroscopic, depending on context.

A particle can be in any physical state. For example, a particle of a substance in a solid state can be as small as a few molecules on the scale of nanometers up to a large particle on the scale of a few millimeters, such as large grains of sand. Similarly, a particle of a substance in a liquid state can be as small as a few molecules on the scale of nanometers up to a large drop on the scale of a few millimeters. A particle of a substance in a gas state is a single atom or molecule that is separated from other atoms or molecules such that intermolecular attractions have relatively little effect on their respective motions.

As used herein, particulate or particulate material refers to matter in the physical form of distinct particles in a solid or liquid state (which means such an association of a few atoms or molecules). As used herein, a particulate is a grouping of particles having similar chemical composition and particle size ranges anywhere in a range of about 0.5 micrometer (500 nm), for example, microscopic clay particles, to about 3 millimeters, for example, large grains of sand.

A particulate can be of solid or liquid particles. As used herein, however, unless the context otherwise requires, particulate refers to a solid particulate. Of course, a solid particulate is a particulate of particles that are in the solid physical state, that is, the constituent atoms, ions, or molecules are sufficiently restricted in their relative movement to result in a fixed shape for each of the particles.

It should be understood that the terms "particle" and "particulate," includes all known shapes of particles including substantially rounded, spherical, oblong, ellipsoid, rod-like, fiber, polyhedral (such as cubic materials), etc., and mixtures thereof. For example, the term "particulate" as used herein is intended to include solid particles having the physical shape of platelets, shavings, flakes, ribbons, rods, strips, spheroids, toroids, pellets, tablets or any other physical shape.

As used herein, a fiber is a particle or grouping of particles having an aspect ratio L/D greater than 5/1.

A particulate will have a particle size distribution ("PSD"). As used herein, "the size" of a particulate can be determined by methods known to persons skilled in the art.

One way to measure the approximate particle size distribution of a solid particulate is with graded screens. A solid particulate material will pass through some specific mesh (that is, have a maximum size; larger pieces will not fit through this mesh) but will be retained by some specific tighter mesh (that is, a minimum size; pieces smaller than this will pass through the mesh). This type of description establishes a range of particle sizes. A "+" before the mesh size indicates the particles are retained by the sieve, while a "−" before the mesh size indicates the particles pass through the sieve. For example, −70/+140 means that 90% or more of the particles will have mesh sizes between the two values.

Particulate materials are sometimes described by a single mesh size, for example, 100 U.S. Standard mesh. If not otherwise stated, a reference to a single particle size means about the mid-point of the industry-accepted mesh size range for the particulate.

Particulates smaller than about 400 U.S. Standard Mesh are usually measured or separated according to other methods because small forces such as electrostatic forces can interfere with separating tiny particulate sizes using a wire mesh.

As used herein, "particle density" or "true density" means the density of a particulate is the density of the individual particles that make up the particulate, in contrast to the bulk density, which measures the average density of a large volume of the powder in a specific medium (usually air). The particle density is a relatively well-defined quantity, as it is not dependent on the degree of compaction of the solid, whereas the bulk density has different values depending on whether it is measured in the freely settled or compacted state (tap density). However, a variety of definitions of particle density are available, which differ in terms of whether pores are included in the particle volume, and whether voids are included. As used herein, particle density includes the apparent density of a particle having any pores or voids into which water does not penetrate.

Dispersions

A dispersion is a system in which particles of a substance of one chemical composition and physical state are dispersed in another substance of a different chemical composition or physical state. In addition, phases can be nested. If a substance has more than one phase, the most external phase is referred to as the continuous phase of the substance as a whole, regardless of the number of different internal phases or nested phases.

A dispersion can be classified in different ways, including, for example, based on the size of the dispersed particles, the uniformity or lack of uniformity of the dispersion, and, if a fluid, by whether or not precipitation occurs.

A dispersion is considered to be heterogeneous if the dispersed particles are not dissolved and are greater than about 1 nanometer in size. (For reference, the diameter of a molecule of toluene is about 1 nm and a molecule of water is about 0.3 nm).

Heterogeneous dispersions can have gas, liquid, or solid as an external phase. For example, in a case where the dispersed-phase particles are liquid in an external phase that is another liquid, this kind of heterogeneous dispersion is more particularly referred to as an emulsion. A solid dispersed phase in a continuous liquid phase is referred to as a sol, suspension, or slurry, partly depending on the size of the dispersed solid particulate.

A dispersion is considered to be homogeneous if the dispersed particles are dissolved in solution or the particles are less than about 1 nanometer in size. Even if not dissolved, a dispersion is considered to be homogeneous if the dispersed particles are less than about 1 nanometer in size.

A solution is a special type of homogeneous mixture. A solution is considered homogeneous: (a) because the ratio of solute to solvent is the same throughout the solution; and (b) because solute will never settle out of solution, even under powerful centrifugation, which is due to intermolecular attraction between the solvent and the solute. An aqueous solution, for example, saltwater, is a homogenous solution in which water is the solvent and salt is the solute.

Hydratability or Solubility

As referred to herein, "hydratable" means capable of being hydrated by contacting the hydratable agent with water. Regarding a hydratable agent that includes a polymer, this means, among other things, to associate sites on the polymer with water molecules and to unravel and extend the polymer chain in the water.

A substance is considered to be "soluble" in a liquid if at least 10 grams of the substance can be hydrated or dissolved in one liter of the liquid when tested at 77° F. and 1 atmosphere pressure for 2 hours, considered to be "insoluble" if less than 1 gram per liter, and considered to be "sparingly soluble" for intermediate solubility values.

As will be appreciated by a person of skill in the art, the hydratability, dispersibility, or solubility of a substance in water can be dependent on the salinity, pH, or other substances in the water. Accordingly, the salinity, pH, and additive selection of the water can be modified to facilitate the hydratability, dispersibility, or solubility of a substance in aqueous solution. To the extent not specified, the hydratability, dispersibility, or solubility of a substance in water is determined in deionized water, at neutral pH, and without any other additives.

The "source" of a chemical species in a solution or in a fluid composition can be a material or substance that is itself the chemical species, or that makes the chemical species chemically available immediately, or it can be a material or substance that gradually or later releases the chemical species to become chemically available in the solution or the fluid.

Fluids

A fluid can be a homogeneous or heterogeneous. In general, a fluid is an amorphous substance that is or has a continuous phase of particles that are smaller than about 1 micrometer that tends to flow and to conform to the outline of its container.

Every fluid inherently has at least a continuous phase. A fluid can have more than one phase. The continuous phase of a fluid for use in a well should be a liquid under Standard Laboratory Conditions. For example, a fluid can be in the form of a suspension (larger solid particles dispersed in a liquid phase), a sol (smaller solid particles dispersed in a liquid phase), an emulsion (liquid particles dispersed in another liquid phase), or a foam (a gas phase dispersed in a liquid phase).

In the context of a fluid, oil is understood to refer to any kind of oil in a liquid state, whereas gas is understood to refer to a physical state of a substance, in contrast to a liquid. In this context, an oil is any substance that is liquid under Standard Laboratory Conditions, is hydrophobic, and soluble in organic solvents. Oils typically have a high carbon and hydrogen content and are non-polar substances. This general definition includes classes such as petrochemical oils, vegetable oils, and many organic solvents.

Apparent Viscosity of a Fluid

Viscosity is a measure of the resistance of a fluid to flow. In everyday terms, viscosity is "thickness" or "internal friction." Therefore, pure water is "thin," having a relatively low viscosity whereas honey is "thick," having a relatively higher viscosity. Put simply, the less viscous the fluid is, the greater its ease of movement (fluidity). More precisely, viscosity is defined as the ratio of shear stress to shear rate.

A fluid moving along solid boundary will incur a shear stress on that boundary. The no-slip condition dictates that the speed of the fluid at the boundary (relative to the boundary) is zero, but at some distance from the boundary the flow speed must equal that of the fluid. The region between these two points is named the boundary layer.

A Newtonian fluid (named after Isaac Newton) is a fluid for which stress versus strain rate curve is linear and passes through the origin. The constant of proportionality is known as the viscosity. Examples of Newtonian fluids include water and most gases. Newton's law of viscosity is an approximation that holds for some substances but not others.

Non-Newtonian fluids exhibit a more complicated relationship between shear stress and velocity gradient (that is, shear rate) than simple linearity. Therefore, there exist a number of forms of non-Newtonian fluids. Shear thickening fluids have an apparent viscosity that increases with increasing the rate of shear. Shear thinning fluids have a viscosity that decreases with increasing rate of shear. Thixotropic fluids become less viscous over time at a constant shear rate. Rheopectic fluids become more viscous over time at a constant shear rate. A Bingham plastic is a material that behaves as a solid at low stresses but flows as a viscous fluid at high yield stresses.

Most fluids are non-Newtonian fluids. Accordingly, the apparent viscosity of a fluid applies only under a particular set of conditions including shear stress versus shear rate, which must be specified or understood from the context. As used herein, a reference to viscosity is actually a reference to an apparent viscosity. Apparent viscosity is commonly expressed in units of mPa·s or centipoise (cP), which are equivalent.

The viscosity of a Newtonian fluid or the apparent viscosity of a non-Newtonian fluid may be highly dependent on the physical conditions, primarily temperature and pressure.

Gels and Deformation

The physical state of a gel is formed by a network of interconnected molecules, such as a crosslinked polymer or a network of micelles. The network gives a gel phase its structure and an apparent yield point. At the molecular level, a gel is a dispersion in which both the network of molecules is continuous and the liquid is continuous. A gel is sometimes considered as a single phase.

Technically, a "gel" is a semi-solid, jelly-like physical state or phase that can have properties ranging from soft and weak to hard and tough. Shearing stresses below a certain finite value fail to produce permanent deformation. The minimum shear stress which will produce permanent deformation is referred to as the shear strength or gel strength of the gel.

In the oil and gas industry, however, the term "gel" may be used to refer to any fluid having a viscosity-increasing agent, regardless of whether it is a viscous fluid or meets the technical definition for the physical state of a gel. A "base gel" is a term used in the field for a fluid that includes a viscosity-increasing agent, such as guar, but that excludes crosslinking agents. Typically, a base gel is mixed with another fluid containing a crosslinker, wherein the mixture is adapted to form a crosslinked gel. Similarly, a "crosslinked gel" may refer to a substance having a viscosity-increasing agent that is crosslinked, regardless of whether it is a viscous fluid or meets the technical definition for the physical state of a gel.

As used herein, a substance referred to as a "gel" is subsumed by the concept of "fluid" if it is a pumpable fluid.

Viscosity and Gel Measurements

There are numerous ways of measuring and modeling viscous properties, and new developments continue to be made. The methods depend on the type of fluid for which viscosity is being measured.

The rheological data from a viscometer/rheometer can be obtained in terms of shear stress or viscosity at desired conditions of shear rate ($\gamma$), temperature (T) and pressure (P). Considering the shear-thinning characteristic of the drilling fluids, pseudoplastic models including power-law model, Eyring model, Cross model, Carrau model, Ellis model or the like may be applied to the Rheology data to extract the characteristic parameters. In addition, the rheology data may also be modeled considering the existence of yield stress (or apparent yield stress), i.e., using viscoplastic models. Different viscoplastic models may include Bingham-plastic model, Casson model, Herschel-Bulkley model or the like. The Rheological properties of the fluid that comprise of rheological data or the characteristics parameters obtained by applying one or more of above pseudoplastic/viscoplastic models are used in an equation to predict the sag rate behavior.

In one embodiment, the rheological properties include viscosity and viscoplastic characteristics from Herschel-Bulkley model in terms of yield stress, and shear thinning index. The viscosity, yield stress, and shear-thinning index can be obtained from a conventional (constant shear rate concentric cylinder viscometer/rheometer with an "API" geometry) viscometer/rheometer. In embodiments the conventional viscometer/rheometer can be a FANN™ model 35, FANN™ model 50, FANN™ model 75, or FANN™ model 77 viscometer/rheometer.

For lost circulation control, it is believed that a crosslinked gel needs to exhibit sufficient viscoelastic properties, in particular relatively high viscosities (for example, at least about 300 mPa·s (cP) at a shear rate of 40 sec-1). One aspect of such gel behavior may be described in the art as "lipping," which may be distinguishable from freely pouring when poured out of a container. "Lipping" as used herein refers to a gel being deformable but retaining a coherent structure that has a lower tendency to disperse than a liquid such as water. Lipping depends on the lifetime of the crosslinking. Fluids are considered lipping if they form a lip when tilted, and that lip will not tear. If the lip is maintained for 5 seconds or longer, the fluid is described as not pourable. A fluid that does not deform or move when the jar is tilted is described as rigid.

As used herein, for the purposes of lost circulation control, a crosslinked fluid is considered to be "viscous" if it has an apparent viscosity equal to or greater than 300 cP mPa·s (cP) at a shear rate of 40 sec-1. The viscosity of a viscous fluid is considered to break or be broken if the viscosity is greatly reduced. Preferably, although not necessarily for all applications depending on how high the initial viscosity of the fluid, the viscous fluid breaks to a viscosity of less than 50 mPa·s (cP) at a shear rate of 40 sec-1.

A substance is considered to be a pumpable fluid if it has an apparent viscosity less than 5,000 mPa·s (cP) (independent of any gel characteristic). For reference, the viscosity of pure water is about 1 mPa·s (cP).

General Measurement Terms

Unless otherwise specified or unless the context otherwise clearly requires, any ratio or percentage means by weight.

Unless otherwise specified or unless the context otherwise clearly requires, the phrase "by weight of the water" means the weight of the water of an aqueous phase of the fluid without the weight of any viscosity-increasing agent, dissolved salt, suspended particulate, or other materials or additives that may be present in the water.

If there is any difference between U.S. or Imperial units, U.S. units are intended. For example, "GPT" or "gal/Mgal" means U.S. gallons per thousand U.S. gallons and "ppt" means pounds per thousand U.S. gallons.

Unless otherwise specified, mesh sizes are in U.S. Standard Mesh.

The micrometer ($\mu$m) may sometimes be referred to herein as a micron.

Converted to SI units, 1 darcy is equivalent to $9.869233 \times 10^{-13}$ m$^2$ or 0.9869233 ($\mu$m)$^2$. This conversion is usually approximated as 1 ($\mu$m)$^2$.

The conversion between pound per thousand gallons (lb/Mgal) and kilogram per cubic meter (kg/m$^3$) is: 1 lb/Mgal=(0.4536 kg/lb)×(Mgal/3.785 m$^3$)=0.12 kg/m$^3$.

General Approach

The invention is directed to a self-triggering lost circulation control during drilling of carbonate formations using an in-situ crosslinked fluid system.

Self-triggering lost circulation control during drilling a carbonate formation is provided using an in-situ crosslinking drilling fluid system. The components of the system are selected such that the carbonate formation itself can act a trigger for crosslinking and gelation of the fluid, which can be used to reduce fluid losses to natural vugs and fractures while drilling in carbonate formations.

According to the invention, methods of drilling a well are provided, the methods including the steps of: (A) forming a drilling fluid comprising an aqueous phase, wherein the aqueous phase comprises: (i) water; (ii) acid, wherein the acid is at least sufficiently strong and in at least a sufficient concentration such that the aqueous phase has an initial pH of less than about 2; (iii) a viscosity-increasing agent; and (iv) a crosslinker, wherein the crosslinker is selected or controlled to crosslink the viscosity-increasing agent at a pH range anywhere in a range of about 1.5 to about 6.5 and that is at least higher than the initial pH of the aqueous phase; and (B) drilling with the drilling fluid to form a wellbore penetrating a subterranean formation.

According to the invention, methods of drilling a well are provided, the methods including the steps of: (A) forming a treatment fluid comprising an aqueous phase, wherein the aqueous phase comprises: (i) water; (ii) acid, wherein the acid is at least sufficiently strong and in at least a sufficient concentration such that the aqueous phase has an initial pH of less than about 2; (iii) a viscosity-increasing agent; and (iv) a crosslinker, wherein the crosslinker is selected or controlled to crosslink the viscosity-increasing agent at a pH range anywhere in a range of about 1.5 to about 6.5 and that is at least higher than the initial pH of the aqueous phase; (B) introducing the treatment fluid into a subterranean formation; and (C) after introducing the treatment fluid into the subterranean formation, drilling to form a wellbore penetrating the subterranean formation.

According to another embodiment of the invention, a drilling or treatment fluid is provided, wherein the drilling or treatment fluid comprises an aqueous phase, and wherein the aqueous phase comprises: (i) water; (ii) acid, wherein the acid is at least sufficiently strong and in at least a sufficient concentration such that the aqueous phase has an initial pH of less than about 2; (iii) a viscosity-increasing agent; (iv) a crosslinker, wherein the crosslinker is selected or controlled to crosslink the viscosity-increasing agent at a pH range anywhere in a range of about 1.5 to about 6.5 and that is at least higher than the initial pH of the aqueous phase; and (v) a lost circulation material ("LCM").

Initially, the drilling or treatment fluid should not be crosslinked during pumping into the well because the initial pH of the aqueous phase should be less than that which would cause crosslinking. When pumped in having a pH less than required for crosslinking, the system will have relatively low viscosity and hence, lower frictional pressure. If desired, the viscosity-increasing agent can be selected and in a concentration to provide at least sufficient viscosity for purposes such as carrying a particulate in the fluid, but the viscosity-increasing agent is not crosslinked. As will be appreciated by a person of skill in the art, the initial pH of the aqueous phase fluid should be lower than that required for crosslinking to occur, which will depend primarily on the particular crosslinker selected. Some types of crosslinkers may be selected for beginning to crosslink at a pH as low as about 1.5. Other crosslinkers, such as ferric chloride, will not begin to crosslink until reaching a pH of about pH 2 or above, allowing for the initial pH of the aqueous phase to be higher than for other types crosslinkers.

The fluid is adapted to begin to crosslink as it encounters a carbonate formation and the acid begins to spend against the carbonate, thereby raising the pH into a range where crosslinking can occur. The system of the viscosity-increasing agent and crosslinker are selected such that they react to form highly viscous fluid when the initial pH increases from less than about 2 to a pH anywhere in a range of about 1.5 to about 6.5 and that is at least higher than the initial pH of the aqueous phase, depending upon the particular crosslinker used.

When the acid reacts with carbonate materials in the formation, the pH will increase into a crosslinking range, thereby activating or triggering the crosslinking and causing the viscosity of the fluid to increase greatly, preferably to the extent of forming a cross-linked gel. In this way, the carbonate formation itself serves as the trigger for the gelling or crosslinking.

Once the fluid crosslinks downhole, further reaction with the carbonate will be retarded by the high viscosity of the fluid or gel.

Additionally, other constituents can be selected and concentrations adjusted to maintain the pH in the range for crosslinking for at least several hours to allow for drilling time. For example, a pH buffering agent can be used to help maintain the pH in the crosslinking range even after acid spends completely to keep the system crosslinked for several hours to days for subsequent drilling.

The system is also adapted to break down when the pH increases above the crosslinking range for the particular system. Preferably and in an embodiment, the system is adapted to break when the pH increases above the crosslinking pH range for the system. This will cause little or no residue damage to the formation.

Depending on the crosslinker, the crosslinking should be broken as the pH increases above the crosslinking pH range. Preferably, once the pH reaches above about 6.5, that is, as acid has completely spent, the crosslinking should be essentially broken and the viscosity reduced from a maximum viscosity obtained when in the crosslinking pH range.

With time and depending on various factors as will be appreciated by those of skill in the art, the acid will continue to spend against carbonate downhole and as the pH continues to increase, the viscosity of the downhole fluid can be adapted to break.

Preferably and in an embodiment, components and chemistry are tailored to retain the crosslinked state such that it is highly viscous or gelled for at least one hour, and preferably longer. A fluid formulation can be tailored to provide high viscosities or gelation for at least several hours. For example, higher concentrations of the viscosity-increasing agent and the crosslinker would help retain gel viscosity for longer time. A buffer can additionally increase the time in the crosslinking pH range.

In case if pH does not increase above the crosslinking range for an undesirably long time (for example, in dolomite formations) or due to a very slow acid reaction rate due to extremely high viscosity or gelled state, a breaker can be added to help break the crosslinking. For example, the crosslinking can be selectively broken by adding a delayed release alkali or overflushing with an alkali fluid so that the pH will increase above the crosslinking range, and preferably neutralize the acidic fluid to a pH above about 6.5.

Developing relatively high viscosity during drilling into a carbonate formation leads to selective lost circulation control in such a formation. After the acid spends completely and the viscosity breaks, cleanup of the broken downhole fluid can be easily achieved. With the crosslinking in the water phase broken, the fluid residues can be easily flowed back from the formation leaving minimal damage.

Accordingly, a carbonate formation can be used to trigger the crosslinking and hence, no pre-crosslink gel formation occurs except where needed during the drilling. The methods have particular application in a drilling a well into a carbonate formation having characteristic of causing lost circulation greater than about 10 bbl/hr (about 1.2 $m^3$/hr).

Preferably and in an embodiment, the fluid is designed and formed to have a sufficient density to help provide an appropriate degree of well control.

Lost circulation materials (LCM), such as a particulate or a fiber material, can also be included in the fluid so that the crosslinked composition or gel has more shear strength.

A fluid and methods according to the invention include a self-triggering, in-situ crosslinking system. The formation, handling, and use of a fluid according to the invention has no special mixing or equipment requirements. Tanks and equipment ordinarily at a well site can be used. Most of the fluids according to the invention can be pumped through a typical bottom hole assembly. The invention eliminates a prior need for pumping two separate fluids—one down through the annulus and another down through the BHA—that then react in a downhole zone of interest. The system can be adjusted to provide for desired crosslinking duration based on job requirements and a design temperature.

The components of a treatment or drilling fluid according to the invention and various design considerations are discussed in more detail below.

Aqueous Phase

Preferably and in an embodiment, a fluid according to the invention or for use in a method according to the invention is preferably a water-based fluid wherein the aqueous phase is the continuous phase of the drilling fluid. For example, the drilling fluid can be a water-based mud.

The water preferably is present in the drilling or treatment fluid in an amount at least sufficient to substantially hydrate the viscosity-increasing agent. In some embodiments, the aqueous phase, including the dissolved materials therein, may be present in a range from about 5% to about 100% by volume of the aqueous phase of the fluid.

The aqueous phase should be compatible with the formation.

The water for the aqueous phase can be freshwater or non-freshwater. Non-freshwater sources of water can include surface water ranging from brackish water to seawater, brine, returned water (sometimes referred to as flowback water) from the delivery of a fluid into a well, unused fluid, and produced water. As used herein, brine refers to water having at least 40,000 mg/L total dissolved solids. In some embodiments, the aqueous phase of the fluid can comprise a brine. Preferably, the water for use in the fluid does not contain anything that would adversely interact with the other components used in the fluid or with the subterranean formation.

Preferably and in some embodiments, the aqueous phase comprises a water-soluble inorganic salt.

Water-soluble salts can be included in the drilling or treatment fluids for many purposes. For example, salts may be added to a water source, for example, to provide a brine, and a resulting fluid, having a desired density. Salts may optionally be included for reasons related to compatibility of the fluid with the formation and formation fluids. To determine whether a salt may be beneficially used for compatibility purposes, a compatibility test may be performed to identify potential compatibility problems. From such tests, one of ordinary skill in the art with the benefit of this disclosure will be able to determine whether a salt should be included in a fluid for use according to the invention.

Suitable salts can include, but are not limited to, calcium chloride, sodium chloride, magnesium chloride, potassium chloride, sodium bromide, potassium bromide, ammonium chloride, sodium formate, potassium formate, cesium formate, and mixtures thereof.

The amount of salt that should be added should be the amount necessary for formation compatibility, such as stability of clay minerals, taking into consideration the crystallization temperature of the brine, for example, the temperature at which the salt precipitates from the brine as the temperature drops. In an embodiment, the water-soluble inorganic salt is in a concentration of at least about 0.1% by weight of the water. More preferably, the inorganic salt is in a concentration of at least about 1% by weight of the water.

Aqueous Phase Including Acid

The aqueous phase includes one or more acids that are sufficiently strong and in a sufficient concentration to cause the water to have a pH of less than 2. More preferably, the aqueous phase has a pH less than 1.5. Most preferably, the aqueous phase has pH less than 1.

The pH value represents the acidity of a solution. The potential of hydrogen (pH) is defined as the negative logarithm to the base 10 of the hydrogen concentration, represented as [$H^+$] in moles/liter.

Mineral acids tend to dissociate in water more easily than organic acids, to produce $H^+$ ions and decrease the pH of the solution. Organic acids tend to dissociate more slowly than mineral acids and less completely.

Relative acid strengths for Bronsted-Lowry acids are expressed by the dissociation constant (pKa). A given acid will give up its proton to the base of an acid with a higher pKa value. The bases of a given acid will deprotonate an acid with a lower pKa value. In case there is more than one acid functionality for a chemical, "pKa(1)" makes it clear that the dissociation constant relates to the first dissociation.

Water ($H_2O$) is the base of the hydronium ion, $H_3O^+$, which has a pKa −1.74. An acid having a pKa less than that of hydronium ion, pKa −1.74, is considered a strong acid.

For example, hydrochloric acid (HCl) has a pKa −7, which is greater than the pKa of the hydronium ion, pKa −1.74. This means that HCl will give up its protons to water essentially completely to form the $H_3O^+$ cation. For this reason, HCl is classified as a strong acid in water. One can assume that all of the HCl in a water solution is 100% dissociated, meaning that both the hydronium ion concentration and the chloride ion concentration correspond directly to the amount of added HCl.

Acetic acid ($CH_3CO_2H$) has a pKa of 4.75, greater than that of the hydronium ion, but less than that of water itself, 15.74. This means that acetic acid can dissociate in water, but only to a small extent. Thus, acetic acid is classified as a weak acid.

In principle any acid that react with carbonate so as to achieve required pH to crosslink the gelling agent and block near wellbore can be used for treatment. Typically any acid that reacts with carbonate can be used, for example HCl. Preferably, the acid is selected for having a pKa less than about 5. Hydrochloric acid has the advantage of being relatively cheap compared to organic acids. Weak acids are better from corrosion point of view. As will be appreciated by a person of skill in the art, the design temperature of the treatment or drilling is another important parameter in selection of acid.

For example, at least 0.1% hydrochloric acid by weight of the water can be used. Preferably, at least 5% hydrochloric acid by weight of the water can be used. While other acids can be used, the strong acid preferably comprises hydrochloric acid. For example, sulfuric acid would produce undesirable sulfur dioxide. As the purpose is to react with carbonate materials, hydrofluoric acid is not required and preferably avoided due to handling issues.

A fluid according to the invention can be designed with weak acids such as formic, acetic acid, citric, which would be less corrosive to downhole tubulars and a bottom hole assembly ("BHA") while drilling. While weak acids can work; however, they tend to have lower acid solubility so they are less preferred.

Aqueous Phase Including pH-Dependent Crosslinking System

Viscosity-Increasing Agent

A viscosity-increasing agent can be used to increase the ability of a fluid.

Increasing the viscosity of a fluid can help prevent a particulate having a different specific gravity than a surrounding phase of the fluid from quickly separating out of the fluid. For example, during drilling, rock cuttings should be carried uphole by the drilling fluid and flowed out of the wellbore. The rock cuttings typically have specific gravity greater than 2, which is much higher than that of many drilling fluids. These high-density cuttings have a tendency to separate from water or oil very rapidly.

A viscosity-increasing agent is sometimes referred to in the art as a viscosifying agent, viscosifier, thickener, gelling agent, or suspending agent. In general, any of these refers to an agent that includes at least the characteristic of increasing the viscosity of a fluid in which it is dispersed or dissolved. There are several kinds of viscosity-increasing agents or techniques for increasing the viscosity of a fluid.

Certain kinds of polymers can be used to increase the viscosity of a fluid. In general, the purpose of using a polymer is to increase the ability of the fluid to suspend and carry a particulate material. Polymers for increasing the viscosity of a fluid are preferably soluble in the external phase of a fluid. Polymers for increasing the viscosity of a fluid can be naturally occurring polymers such as polysaccharides, derivatives of naturally occurring polymers, or synthetic polymers (for example, a polyacrylamide).

Fluids used in high volumes, such as drilling fluids, are usually water-based. Efficient and inexpensive viscosity-increasing agents for water include certain classes of water-soluble polymers.

Preferably or in some embodiments, the viscosity-increasing agent comprises a polyacrylamide-based polymer. Polyacrylamide is soluble/dispersible in water. A preferred viscosity-increasing agent for temperatures up to about 200° F. (about 93° C.) is or comprises a terpolymer of 2-acrylamido-2-methylpropane sulfonic acid ("AMPS"), acrylamide, and acrylic acid. A preferred viscosity-increasing agent for temperatures above about 200° F. (about 93° C.) comprises a polyacrylamide quaternary ammonium salt, which is expected to be suitable up to at least 300° F. (150° C.).

The water-soluble polymer can have an average molecular weight in a range of about 50,000 to 20,000,000, most preferably from about 100,000 to about 4,000,000. For example, guar polymer is believed to have a molecular weight in a range of about 2 to about 4 million.

The viscosity-increasing agent may be present in the fluids in a concentration in a range of from about 0.01% to about 10% by weight of the water of the aqueous phase. More preferably, the viscosity-increasing agent is present in a range of about 0.1% to about 5% by weight of the water. Still more preferably, viscosity-increasing agent is present in a range of about 0.5% to about 3% by weight of the water. Most preferably, the viscosity-increasing agent should be present in a form and in a concentration at least sufficient to impart the desired viscosity to a fluid. For example, the concentration of viscosity-increasing agent used in the fluids can vary from about 0.25 pounds per 1,000 gallons of water in the aqueous phase of fluid ("lbs/Mgal") to about 200 lbs/Mgal. In other embodiments, the concentration of viscosity-increasing agent included in the treatment fluids may vary from about 10 lbs/Mgal to about 80 lbs/Mgal. In another embodiment, about 20 pounds to about 70 pounds (lbs) of water-soluble polymer per 1,000 gallons (Mgal) of water (equivalent to about 2.4 g/L to about 8.4 g/L).

If any solid particulates included in the fluid, the viscosity of the fluid should be at least sufficient to suspend the particulate for transport in the fluid.

The viscosity-increasing agent can be provided in any form that is suitable for the particular fluid or application. For example, the viscosity-increasing agent can be provided as a liquid, gel, suspension, or solid additive that is incorporated into a treatment fluid.

As will be appreciated by a person of skill in the art, the dispersibility or solubility in water of a certain kind of polymeric material may be dependent on the salinity or pH of the water. Accordingly, the salinity or pH of the water can be modified to facilitate the dispersibility or solubility of the water-soluble polymer. In some cases, the water-soluble polymer can be mixed with a surfactant to facilitate its dispersibility or solubility in the water or salt solution utilized.

Crosslinker

The viscosity of a fluid at a given concentration of viscosity-increasing agent can be greatly increased by crosslinking the viscosity-increasing agent. A crosslinking agent, sometimes referred to as a crosslinker, can be used for this purpose. A crosslinker interacts with at least two polymer molecules to form a "crosslink" between them.

If crosslinked to a sufficient extent, the polymeric viscosity-increasing agent can form a gel with water. Gel formation is based on a number of factors including the particular polymer and concentration thereof, the particular crosslinker and concentration thereof, the degree of crosslinking, temperature, and a variety of other factors known to those of ordinary skill in the art.

The degree of crosslinking depends on the type of viscosity-increasing polymer used, the type of crosslinker, concentrations, temperature of the fluid, etc. Shear is usually required to mix the base gel and the crosslinking agent. Therefore, the actual number of crosslinks that are possible and that actually form also depends on the shear level of the system. The exact number of crosslink sites is not well known, but it could be as few as one to about ten per polymer molecule. Without being limited by any theory, the number of crosslinks is believed to significantly alter fluid viscosity.

Crosslinking agents typically comprise at least one metal ion that is capable of crosslinking the viscosity-increasing agent molecules.

Certain crosslinking agents are pH-dependent. Preferably, the in-situ crosslinking agent is pH dependent. The crosslinker performs in a certain pH range, that is, anywhere in a range between about pH 1 and about pH 4. Initially, the acid has pH less than 1 as the concentration of acid (HCl) is greater than 5%. As acid starts spending on the carbonate the neutralizations starts, that is, the pH of the water phase starts to increase. Once the pH comes near 1 or above, the crosslinkers starts crosslinking the gelling agents. Due to crosslinked acid phase the acid spending rate decreases further. Over the time the acid continue to spend and therefore pH reaches 4 or above and the cross linker is no more active above this pH rage and system gets de-crosslinked. This breaks the crosslinking.

The crosslinking agent generally should be included in the fluids in an amount sufficient, among other things, to provide a desired degree of cross linking. In some embodiments, the crosslinking agent may be present in the treatment fluids in an amount in a range of from about 0.01% to about 5% by weight of the water in the fluid.

Chromium-based crosslinkers were promptly excluded because certain chromium species can be toxic in nature. Iron, aluminum, titanium, cobalt, and zirconium-based crosslinkers have no health, safety, or environmental concerns and are very safe to handle. The presently most preferred crosslinker is iron chloride ($FeCl_3$), which is readily commercially available, for example, as a 45% by weight aqueous solution.

Preferred Embodiment of pH-Dependent System

In a preferred embodiment, the polymeric viscosity-increasing agent is a polyacrylamide based polymer. The polyacrylamide based polymer is preferably either anionic or cationic in nature.

An example of a pH-dependent crosslinker is iron chloride (also known as ferric chloride or $FeCl_3$).

Another example of a self-diverting acid system is described in European Patent Application Publication No. 0278540 B1, assigned to Schlumberger Technology. The strongly acidic system initially has low viscosity but includes a soluble ferric ion source and a polymeric gelling agent that is crosslinked by ferric ions at a pH of about 2 or greater but not at a lower pH. However, the polymer is not crosslinked by ferrous ions. Therefore, the system includes a reducing agent that reduces ferric ions to ferrous ions, but only at a pH above about 3 to 3.5. Consequently, as the acid spends, for example in a wormhole, and the pH increases to about 2 or greater, the polymer crosslinks, and a very viscous gel forms that inhibits further flow of fresh acid into the wormhole. As the acid spends further and the pH continues to rise, the reducing agent converts the ferric ions to ferrous ions and the gel reverts to a more fluid water-like state. Hydrazine salts and hydroxylamine salts are specified as the reducing agents.

pH Buffer

In certain embodiments, the aqueous phase of a fluid according to the invention can include a pH buffer. The buffering agent can be added to extend the retention time of crosslinking, that is, maintaining the pH in a crosslinking range. The pH-buffer can be selected and present in the drilling fluids in an amount sufficient to help maintain the pH of the fluid within a desired range that balances the duration of certain properties of the treatment fluid (for example, a high viscosity in a carbonate formation) with the ability of a breaker to reduce the viscosity of the fluid to later decrease in the viscosity of the treatment fluid such that it does not hinder production of hydrocarbons from the formation.

Preferably, the pH of the continuous aqueous phase of the treatment fluid is buffered to be less than 5, whereby the crosslinking will be maintained for an adequate duration for the drilling operation. More preferably, the pH-adjuster may be selected to buffer the pH of the fluid to a pH anywhere in a range of from about 3 to about 5.

In certain embodiments, the pH-adjuster comprises a salt of an organic acid such as sodium, potassium, or cesium formate, sodium or potassium acetate, sodium or potassium citrate, sodium or potassium glycolate, sodium or potassium maleate, sodium or potassium phosphate, potassium dihydrogen phosphate, and any combinations thereof.

In case of hydrochloric acid is used in a treatment fluid, weak acids such as acetic acid, formic acid, glycolic acid, citric acid, and any combination thereof can be used as a buffer. Other buffers include, without limitation, aluminum mono-carboxylates, aluminum di-carboxylates, and aluminum tri-carboxylates of the weak carboxylic acids are water soluble at a pH in a range of about 6 to about 7. It is believed this will help protect against any aluminum precipitation, in case aluminum is used as a crosslinker.

One of ordinary skill in the art, with the benefit of this disclosure, will recognize the appropriate pH-buffer and amount thereof to use for a chosen application.

Particulate Weighting Agents ("High-Gravity Solids")

Weighting agents are commonly used in drilling fluids. As used herein a weighting agent has an intrinsic density or specific gravity greater than 2.7. Preferably, the weighting agent has a specific gravity in a range of 2.7 to 8.0. Weighting agents are sometimes referred to herein as "high-gravity solids" or "HGS".

Various types of "high gravity solids" along with their respective densities could be found in Table 1. Thus, barite would be an example.

TABLE 1

Weighting Agents

| HGS Material | True Density (Specific Gravity) |
| --- | --- |
| Hematite | 5.1-5.3 |
| Iron Oxide | 5.1-5.8 |
| Manganese Tetroxide | 4.7-4.9 |
| Galena | 7.2-7.6 |
| Magnetite | 5.1-5.2 |
| Ilmenite | 4.7-4.8 |
| Barite | 4.0-4.5 |
| Siderite | 3.9-4.0 |
| Celesite | 3.9-4.0 |
| Dolomite | 2.8-2.9 |

Any suitable particulate weighting agent can be employed according to the invention. For example, barite is a mineral consisting essentially of barium sulfate ($BaSO_4$). Barite is insoluble in water or oil and has a true density in a range of about 4.0 to about 4.5 g/cm. It can be formed into a particulate useful as a weighting agent in drilling fluids or other fluids. Other examples of weighting agents include, for example, particulate weighting material such as barite, hematite, iron oxide, manganese tetroxide, galena, magnetite, lilmenite, siderite, celesite, or any combination thereof.

A weighting agent should be compatible with the treatment fluid. In the context of the present invention, preferably and in some embodiments the weighting agent is insoluble in aqueous acid having a pH less than about 2.

Preferably, the HGS particulate has a particle size distribution anywhere in a range of 0.1 to 500 micrometers (less than about 20 US mesh).

Low-Density Particulate ("Low-Gravity Solids")

In addition to one or more weighting agents, low-gravity solids (that is, solids in particulate form having a true density less than the density of barite) can be included in the fluid.

As used herein, "low gravity solids" or "LGS" are particulates in the density range of the density of the oil phase up to 2.7 Specific Gravity. Examples include calcium carbonate, marble, or any combination thereof.

If included, the LGS particulate preferably has a particle size distribution anywhere in a range of 0.1 to 500 micrometers (less than about 20 US mesh).

Lost Circulation Material

An example of a type of low-gravity solids that can be including in a drilling or treatment fluid includes a lost circulation material in solid form, such as a particulate or fiber.

Preferably or in an embodiment, the drilling fluid includes a lost circulation material ("LCM") that blocks the high permeability, vug, or natural fracture at or near the borehole of the zone. For example, the lost circulation material can be a particulate that has a size selected to bridge and plug the pore throats of the matrix of the lost circulation zone. As the fluid phase carrying the lost circulation control material flows into the formation, the lost circulation material bridges the pore throats of the matrix of the formation and builds up on the surface of the borehole or fracture face or penetrates only a little into the matrix. All else being equal, the higher the concentration of the appropriately sized particulate, the faster bridging will occur.

A lost circulation material should be compatible with the treatment fluid. In the context of the present invention, in some embodiments the lost circulation material is insoluble in aqueous acid having a pH less than about 2. For example, while ground marble (calcite) is commonly used as a lost circulation material, it is a form of a calcium carbonate and may react with the acid and prematurely increase the pH of the fluid. Nevertheless, it can also be desirable that the lost circulation material be degradable over time, as will be appreciated by a person of skill in the art.

Examples of lost circulation materials include, but are not limited to, solid particulates of nut shells, ground marble, graphite materials, rice husk, paper, starch, silica flour, benzoic acid, soap, resin, and any combination thereof, and degradable gel particulates. Lost circulation materials that are non-degradable or acid insoluble or acid non-breakable can be used in non-producing zones. Lost circulation materials that are degradable or acid soluble or acid breakable are preferred for use in producing zones.

An example of a lost circulation material is a solid material that comprises a degradable material. Examples of such degradable materials include polysaccharides such as dextran or cellulose; chitins; chitosans; proteins; aliphatic polyesters; poly(lactides); poly(glycolides); poly(glycolide-co-lactides); poly(ε-caprolactones); poly(3-hydroxybutyrates); poly(3-hydroxybutyrate-co-hydroxyvalerates); poly(anhydrides); aliphatic poly(carbonates); poly(orthoesters); poly(amino acids); poly(ethylene oxides); poly(phosphazenes); derivatives thereof; or combinations thereof.

In certain embodiments, fibers can be used as a lost circulation material. Examples of fiber materials include without limitation polypropylene fibers, carbon fibers, polylactic acid ("PLA") fibers, and cellulosic fibers, and any combination thereof.

As will be appreciated by those of skill in the art, fibers longer than about 3 mm can sometimes pose pumpability restrictions, especially when included in high concentrations, making the use of long fibers undesirable in some cases. For example, additional equipment may be required to cause a fluid containing long fibers to by-pass certain types of downhole tools. Generally, fibers less than 3 mm long are acceptable for not causing pumpability restrictions for fluid, that is, for not unduly increasing the apparent viscosity or consistency of the fluid.

A lost circulation material can be added to a treatment fluid in a concentration necessary to give the desired lost circulation control. In some embodiments, a lost circulation material in particulate form (not fiber) can be included in a concentration of about 5 to about 3,000 lbs/Mgal (125 lb/bbl) of the treatment fluid. In some embodiments, a lost circulation material in fiber form can be included in a concentration from about 5 to about 125 lbs/Mgal (5 lb/bbl) of the drilling or treatment fluid.

Chemical Breaker

Reducing the viscosity of a viscosified fluid is referred to as "breaking" the fluid. Chemicals used to reduce the viscosity of fluids are called breakers.

Breakers for reducing viscosity must be selected to meet the needs of each situation. First, it is important to understand the general performance criteria for breaking. In reducing the viscosity of the treatment fluid to a near water-thin state, the breaker must maintain a critical balance. Premature reduction of viscosity during the pumping of a treatment fluid can jeopardize the treatment. Inadequate reduction of fluid viscosity after pumping can also reduce production if the required conductivity is not obtained. A breaker should be selected based on its performance in the temperature, pH, time, and desired viscosity profile for each specific treatment.

No particular mechanism is necessarily implied by breaking or breaker regarding the viscosity of a fluid.

For example, for use a fluid viscosified with a polymeric material as the viscosity-increasing agent, a breaker can operate by cleaving the backbone of polymer by hydrolysis of acetyl group, cleavage of glycosidic bonds, oxidative/reductive cleavage, free radical breakage, or a combination of these processes. Accordingly, such a breaker can reduce the molecular weight of the polymer by cutting the long polymer chain. As the length of the polymer chain is cut, the viscosity of the fluid is reduced.

In another example, a breaker may reverse a crosslinking of a viscosity-increasing agent or attack the crosslinker.

Preferably or in an embodiment, the drilling fluid comprises a breaker or the downhole drilling fluid can be mixed with another fluid having a breaker for the viscosity of the downhole drilling fluid. For example, sodium hydroxide can be used as a breaker to increase the pH and thereby break the crosslinking of the downhole crosslinked fluid. By way of another example, certain reducing agents can be used to help break the crosslinking of the fluid system according to the invention, such as sodium erythorbate.

Corrosion Using Acids in Fluids

Although using acid in a well is possible, it can also have significant drawbacks. For example, acidic fluids can be problematic in that they can cause corrosion of metals.

"Corrosion" is the loss of metal due to chemical or electrochemical reactions, which could eventually destroy a structure. The corrosion rate will vary with time depending on the particular conditions to which a metal is exposed, such as the amount of water, pH, other chemicals, temperature, and pressure. Examples of common types of corrosion include, but are not limited to, the rusting of metal, the dissolution of a metal in an acidic solution, oxidation of a metal, chemical attack of a metal, electrochemical attack of a metal, and patina development on the surface of a metal.

As used herein with reference to the problem of corrosion, "acid" or "acidity" refers to a Bronsted-Lowry acid or acidity. As mineral acids are stronger acids than organic acids, mineral acids tend to be more corrosive than organic acids. In addition, at elevated temperatures the dissociation rate increases significantly, and hence, all else being equal, an acid becomes more corrosive.

The mechanism of corrosion for both cases (mineral acids and organic acids) is expected to be same, the only difference is in the rate of corrosion. The rate of corrosion will depend upon the availability of $H^+$ ion released from acid. Mineral acids dissociate completely to give more $H^+$ ions as compared to organic acids.

Even weakly acidic fluids having a pH up to about 4 can be problematic in that they can cause corrosion of metals. Above pH 4, corrosion is dependent upon oxygen concentration and much less dependent on pH.

Corrosion of metal can occur anywhere in a well production system, such in the downhole tubulars, equipment, and tools of a well, in surface lines and equipment, or transportation pipelines and equipment.

The expense of repairing or replacing corrosion-damaged tubulars and equipment is extremely high. The corrosion problem is exacerbated by the elevated temperatures encountered in deeper formations. The increased corrosion rate of the ferrous and other metals comprising the tubular goods and other equipment results in quantities of the acidic solution being neutralized before it ever enters the subterranean formation, which can compound the deeper penetration problem discussed above. In addition, the partial neutralization of the acid from undesired corrosion reactions can result in the production of quantities of metal ions that are highly undesirable in the subterranean formation.

Corrosion Inhibitor

To combat the potential corrosion problem in well operations with acidic fluids, corrosion inhibitors can be used to reduce corrosion to metals and metal alloys.

As used herein, the term "inhibit" or "inhibitor" refers to slowing down or lessening the tendency of a phenomenon (for example, corrosion) to occur or the degree to which that phenomenon occurs. The term "inhibit" or "inhibitor" does not imply any particular mechanism, or degree of inhibition.

A "corrosion inhibitor package" can include one or more different chemical corrosion inhibitors, sometimes delivered to the well site in one or more solvents to improve flowability or handleability of the corrosion inhibitor before forming a fluid.

Examples of corrosion inhibitors include acetylenic alcohols, Mannich condensation products (such as those formed by reacting an aldehyde, a carbonyl containing compound and a nitrogen containing compound), unsaturated carbonyl compounds, unsaturated ether compounds, formamide, formic acid, formates, other sources of carbonyl, iodides, terpenes, and aromatic hydrocarbons, coffee, tobacco, gelatin, cinnamaldehyde, cinnamaldehyde derivatives, acetylenic alcohols, fluorinated surfactants, quaternary derivatives of heterocyclic nitrogen bases, quaternary derivatives of halomethylated aromatic compounds, combinations of such compounds used in conjunction with iodine; quaternary ammonium compounds; and combinations thereof. Suitable corrosion inhibitors and intensifiers are available from Halliburton Energy Services and include: "MSA-II™" corrosion inhibitor, "MSA-III" corrosion inhibitor, "HAI-25 E+" environmentally friendly low temp corrosion inhibitor, "HAI-404™" acid corrosion inhibitor, "HAI-50™" Inhibitor, "HAI-60™" Corrosion inhibitor, "HAI-62™" acid corrosion inhibitor, "HAI-65™" Corrosion inhibitor, "HAI-72E+™" Corrosion inhibitor, "HAI-75™" High temperature acid inhibitor, "HAI-81M™" Acid corrosion inhibitor, "HAI-85™" Acid corrosion inhibitor, "HAI-85M™" Acid corrosion inhibitor, "HAI-202 Environmental Corrosion Inhibitor," "HAI-OS" Corrosion Inhibitor, "HAI-GE" Corrosion Inhibitor, "FDP-S692-03" Corrosion inhibitor for organic acids, "FDP-S656AM-02" and "FDP-S656BW-02" Environmental Corrosion Inhibitor System, "HII-500" Corrosion inhibitor intensifier, "HII-500M" Corrosion inhibitor intensifier, "HII-124" Acid inhibitor intensifier, "HII-124B" Acid inhibitor intensifier, "HII-124C™" Inhibitor intensifier, and "HII-124F™" corrosion inhibitor intensifier.

HAI-404M™ is a cationic corrosion inhibitor with a quaternary compound. Typical concentrations of HAI-404M™ are in a range of about 8 gal/Mgal to about 12 gal/Mgal. HAI-404M™ acid corrosion inhibitor, formerly known as HAI-404™ acid corrosion inhibitor, is a high-performance, cationic acid corrosion inhibitor designed for use in hydrochloric acids (HCl) blends. Alloys such as N-80, J-55, 13Cr, S13Cr-110, 22Cr, and 25Cr can be effectively inhibited with HAI-404M™ inhibitor.

HAI-OS™ is a nonionic HCl corrosion inhibitor. It demonstrates excellent solubility in weighted and un-weighted fluids at room temperature and bottom hole static temperature (BHST). Typical concentrations used are in a range of about 8 gal/Mgal to about 16 gal/Mgal.

According to a preferred embodiment of the invention, the corrosion inhibitor is selected from the group consisting of: a quaternary ammonium salt such as 1-(benzyl)quinolinium chloride, preferably together with an aldehyde.

The corrosion inhibitor is preferably in a concentration of at least 0.1% by weight of the water. More preferably, the corrosion inhibitor is in a concentration in a range of about 0.1% to about 15% by weight of the water.

Corrosion Inhibitor Intensifier

A corrosion inhibitor "intensifier" is a chemical compound that itself does not inhibit corrosion, but enhances the effectiveness of a corrosion inhibitor over the effectiveness of the corrosion inhibitor without the corrosion inhibitor intensifier.

Formic acid is a corrosion inhibitor intensifier.

Potassium iodide is another corrosion-inhibitor intensifier, which when used with some reducing agents, helps convert ferric iron to ferrous iron in unspent acid. Potassium iodide intensifier can be used in acid systems containing up to 28% hydrochloric acid (HCl). It is especially effective in combination with formic acid or HII-124C™ intensifiers. Potassium iodide intensifier is effective at bottom hole temperatures (BHTs) up to at least 425° F. (218° C.). Intensifier concentrations typically vary between about 1 lb/Mgal to about 100 lb/Mgal. Potassium iodide intensifier can be used with all acid-corrosion inhibitors. It is not compatible with diazonium salts, oxidants, or bromine. When used with an appropriate reducing agent, it will help decrease corrosion rates, additive separation, sludging, and emulsions caused by ferric iron.

According to a preferred embodiment of the invention, the corrosion inhibitor intensifier is selected from the group consisting of: formic acid and potassium iodide.

When included in a fluid according to the invention, the corrosion inhibitor intensifier is preferably in a concentration of at least 0.1% by weight of the water of the fluid. More preferably, the corrosion inhibitor intensifier is in a concentration in a range of about 0.1% to about 20% by weight of the water of the fluid.

Other Additives

In certain embodiments, the fluid also can optionally comprise one or more other commonly used fluid additives, such as those selected from the group consisting of surfactants, bactericides, clay stabilizers, chelants, scale inhibitors, salt substitutes (such as trimethyl ammonium chloride), relative permeability modifiers (such as HPT-1™ commercially available from Halliburton Energy Services, Duncan, Okla.), sulfide scavengers, nanoparticles, and any combinations thereof.

Method of Drilling or Treating a Well with the Fluid

According to another embodiment of the invention, a method of treating a well, is provided, the method including the steps of: forming a drilling or treatment fluid according to the invention; and introducing the fluid into the well.

According to a preferred embodiment of the method, the subterranean formation to be treated is a carbonate formation. Preferably and in an embodiment, the carbonate formation is causing lost circulation. For example, the carbonate formation may be causing lost circulation greater than about 10 bbl/hr (about 1.2 m$^3$/hr).

A fluid can be prepared at the job site, prepared at a plant or facility prior to use, or certain components of the fluid can be pre-mixed prior to use and then transported to the job site. Certain components of the fluid may be provided as a "dry mix" to be combined with fluid or other components prior to or during introducing the fluid into the well.

A base gel can be prepared off-site and transported to the well site, if desired. However, if so, it would be helpful to check on gel degradation profile to make sure the base gel is suitable for use at the time of forming the fluid and introducing the fluid into a well. If the viscosity-increasing agent is hydrated or the base gel is prepared on site, a gel hydration tank is normally required.

In certain embodiments, the preparation of a fluid can be done at the job site in a method characterized as being performed "on the fly." The term "on the fly" is used herein to include methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing.

Often the step of delivering a fluid into a well is within a relatively short period after forming the fluid, for example, less within 30 minutes to one hour. More preferably, the step of delivering the fluid is immediately after the step of forming the fluid, which is "on the fly."

It should be understood that the step of delivering a fluid into a well can advantageously include the use of one or more fluid pumps.

Preferably and in an embodiment, the step of introducing is at a rate and pressure below the fracture pressure of the treatment zone.

Preferably and in an embodiment, the step of introducing includes circulating the fluid in the well while drilling. In another embodiment, the fluid can be used as a lost circulation pill for treating a zone followed by drilling in the zone.

When the drilling or treatment fluid contacts a carbonate formation, it will begin to spend and start to increase the viscosity. The fluid may be adapted for form highly viscous, lipping gel. This will also tend to retard additional reaction with the adjacent carbonate, allowing time for drilling.

After the step of drilling, it may be helpful or necessary to allow additional time for the fluid to break as it continues to spend against a carbonate formation. In some embodiments of the method, it may be helpful to overflush with another fluid comprising an alkali or other breaker for the gelled system so that the gelled downhole fluid can be broken and flowed back out of the well.

Preferably and in an embodiment, the step of flowing back from a producing zone is prior to a step of completing the well. In another embodiment, the step of flowing back from a producing zone is part of a step of producing oil or gas from the zone.

Returned drilling fluid or treatment fluid after having been used downhole in a well is expected to typically have been substantially neutralized fluid due to reaction with carbonate downhole. If not fully neutralized, the returned acidic fluid can be neutralized on the surface before disposal or reuse.

After drilling to extend a borehole of a wellbore, the next step is completion of the extended portion to prepare for production of oil or gas from a zone in the extended portion.

Preferably, after any such well treatment, a step of producing hydrocarbon from the subterranean formation is the desirable objective.

EXAMPLES

To facilitate a better understanding of the present invention, the following examples of certain aspects of some embodiments are given. In no way should the following examples be read to limit, or define, the entire scope of the invention.

Example 1

An example fluid was prepared having water, formic acid in a concentration of about 1% by weight of the water, such that the initial pH of the aqueous solution was in a range of about 1-2. To this solution, a viscosity-increasing agent of a terpolymer of 2-acrylamido-2-methylpropane sulfonic acid ("AMPS"), acrylamide, and acrylic acid was added in a concentration of about 2% by weight of the water. The viscosity-increasing agent was allowed to hydrate in the aqueous solution for about 10 minutes. Next, a crosslinker of ferric chloride was added to the aqueous solution in a concentration of about 0.45% by weight of the water. Finally, $CaCO_3$ particulate was added in a stoichiometric excess to the acid. The example fluid was then heated in a temperature control bath at about 190° F. (88° C.) for about 10 minutes. A little shearing with glass rod triggered crosslinking as the pH of the fluid started to increase from the initial pH of the aqueous phase due to the reaction of the acid with the carbonate. With rising pH, the fluid became a highly viscous, lipping gel. The sample was kept overnight in the heating bath at about 190° F. (88° C.). The gel was stable even after 24 hours due to the slow reaction of acid with carbonate that maintained the pH of the gel below about 4. The gel can then be broken once the acid is spent. In this case, the gel was broken with intense stifling so as to cause the acid to completely react with the carbonate, raising the pH above about 6.5.

Example 2

Another example was prepared similar to Example 1, the only difference being that the acid was hydrochloric acid in a concentration of about 1% by weight of the water and the initial pH was less than 1. The fluid developed into a similar viscous, lipping gel that could be broken with the spending of the acid against the carbonate. In this example, the viscosity of the before crosslinking was measured using a FANN™ model 35 viscometer as a function of shear rate. The fluid was held at a constant 300 rpm between readings with R1B1 rotor bob arrangement. The data was collected and averaged. The viscosity of the fluid before crosslinking was 45 cP at 511 $s^{-1}$ and 30 cP at 1028 $s^{-1}$.

CONCLUSION

Therefore, the present invention is well adapted to attain the ends and advantages mentioned as well as those that are inherent therein.

The exemplary fluids disclosed herein may directly or indirectly affect one or more components or pieces of equipment associated with the preparation, delivery, recapture, recycling, reuse, or disposal of the disclosed fluids. For example, the disclosed fluids may directly or indirectly affect one or more mixers, related mixing equipment, mud pits, storage facilities or units, fluid separators, heat exchangers, sensors, gauges, pumps, compressors, and the like used generate, store, monitor, regulate, or recondition the exemplary fluids. The disclosed fluids may also directly or indirectly affect any transport or delivery equipment used to convey the fluids to a well site or downhole such as, for example, any transport vessels, conduits, pipelines, trucks, tubulars, or pipes used to fluidically move the fluids from one location to another, any pumps, compressors, or motors (for example, topside or downhole) used to drive the fluids into motion, any valves or related joints used to regulate the pressure or flow rate of the fluids, and any sensors (i.e., pressure and temperature), gauges, or combinations thereof, and the like. The disclosed fluids may also directly or indirectly affect the various downhole equipment and tools that may come into contact with the chemicals/fluids such as, but not limited to, drill string, coiled tubing, drill pipe, drill collars, mud motors, downhole motors or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

The particular embodiments disclosed above are illustrative only, as the present invention may be modified and practiced in different but equivalent manners apparent to those skilled in the art having the benefit of the teachings herein. It is, therefore, evident that the particular illustrative embodiments disclosed above may be altered or modified and all such variations are considered within the scope of the present invention.

The various elements or steps according to the disclosed elements or steps can be combined advantageously or practiced together in various combinations or sub-combinations of elements or sequences of steps to increase the efficiency and benefits that can be obtained from the invention.

It will be appreciated that one or more of the above embodiments may be combined with one or more of the other embodiments, unless explicitly stated otherwise.

The invention illustratively disclosed herein suitably may be practiced in the absence of any element or step that is not specifically disclosed or claimed.

Furthermore, no limitations are intended to the details of construction, composition, design, or steps herein shown, other than as described in the claims.

What is claimed is:

1. A method of drilling a well, the method comprising the steps of:
   (A) forming a drilling fluid comprising at least an aqueous phase, wherein the aqueous phase comprises:
      (i) water;
      (ii) acid, wherein the acid is at least sufficiently strong and in at least a sufficient concentration such that the aqueous phase has an initial pH of less than about 2;
      (iii) a viscosity-increasing agent; and
      (iv) a crosslinker, wherein the crosslinker is selected or controlled to crosslink the viscosity-increasing agent at a pH range anywhere in a range of about 1.5 to about 6.5 and that is at least higher than the initial pH of the aqueous phase;
   (B) using the drilling fluid to drill at least a portion of a wellbore penetrating a subterranean formation; and
   (C) spending the acid against a carbonate material to increase the pH of the drilling fluid, wherein as the acid spends against the carbonate material but before it spends completely, the aqueous phase increases a viscosity of the drilling fluid to greater than 300 cP at 40 1/s shear rate; and
   (D) further spending the acid against the carbonate material to increase the pH of the aqueous phase to greater than about 6.5, wherein said pH of greater than about 6.5 breaks one or more crosslinks between the crosslinker and the viscosity-increasing agent, thereby reducing the viscosity of the drilling fluid.

2. The method according to claim 1, wherein the drilling fluid comprises a continuous phase that comprises the aqueous phase and a disperse phase.

3. The method according to claim 1, wherein the aqueous phase additionally comprises a water-soluble inorganic salt.

4. The method according to claim 3, wherein the water-soluble inorganic salt is in a concentration of at least 0.1% by weight of the water.

5. The method according to claim 1, wherein the acid comprises a weak organic acid selected from the group consisting of: formic acid, acetic acid, and any combination thereof.

6. The method according to claim 1, wherein the acid comprises a strong acid.

7. The method according to claim 1, wherein the aqueous phase additionally comprises a buffer.

8. The method according to claim 1, wherein the viscosity-increasing agent comprises a polyacrylamide based-polymer in a concentration of between about 0.01% to about 10% by weight of the water.

9. The method according to claim 1, wherein the viscosity-increasing agent is in a concentration of at least 0.1% by weight of the water.

10. The method according to claim 1, wherein the crosslinker comprises ferric chloride.

11. The method according to claim 1, wherein the crosslinker is in a concentration of at least 0.01% by weight of the water.

12. The method according to claim 1, wherein the drilling fluid additionally comprises a lost circulation material.

13. The method according to claim 1, wherein the lost circulation material is insoluble in aqueous acid having a pH less than about 2.

14. The method according to claim 1, wherein the drilling fluid additionally comprises a breaker for the viscosity-increasing agent.

15. The method according to claim 1, wherein the drilling fluid additionally comprises a corrosion inhibitor.

16. The method according to claim 1, wherein the subterranean formation is a carbonate formation.

17. A method comprising:
   (A) forming a treatment fluid comprising at least an aqueous phase, wherein the aqueous phase comprises:
      (i) water;
      (ii) acid, wherein the acid is at least sufficiently strong and in at least a sufficient concentration such that the aqueous phase has an initial pH of less than about 2;
      (iii) a viscosity-increasing agent; and
      (iv) a crosslinker, wherein the crosslinker is selected or controlled to crosslink the viscosity-increasing agent at a pH range anywhere in a range of about 1.5 to about 6.5 and that is at least higher than the initial pH of the aqueous phase;
   (B) introducing the treatment fluid into a previously fractured subterranean formation;
   (C) after introducing the treatment fluid into the subterranean formation, drilling to form a wellbore penetrating the previously fractured subterranean formation; and
   (D) spending the acid against a carbonate material to increase the pH of the drilling fluid, wherein as the acid spends against the carbonate material but before it spends completely, the aqueous phase increases a viscosity of the treatment fluid to greater than 300 cP at 40 1/s shear rate; and
   (E) further spending the acid against the carbonate material to increase the pH of the aqueous phase to greater than about 6.5, wherein said pH of greater than about 6.5 breaks one or more crosslinks between the crosslinker and the viscosity-increasing agent, thereby reducing the viscosity of the drilling fluid.

18. The method according to claim 1, wherein the drilling fluid further comprises a weighting agent selected from the group consisting of barite, hematite, iron oxide, manganese tetroxide, galena, magnetite, lilmenite, siderite, celesite, and any combination thereof.

* * * * *